UNITED STATES PATENT OFFICE 2,343,781

SPIRIT PRINTING COMPOSITION

Roy Clifford Locke, Salem, N. J., assignor to E. I. du Pont de Nemours & Company, Wilmington, Del., a corporation of Delaware No Drawing. Application May 15, 1943, Serial No. 487,151

3 Claims. (Cl. 106—30)

This invention relates to spirit printing inks comprising a basic dye, preferably a water-soluble dye, a wood rosin, e. g., abietic acid or hydrogenated abietic acid, and a volatile organic solvent, such as ethyl alcohol.

This invention has as an object to produce an improved product for the spirit printing of basic dyes. A further object is to produce an improved product for the spirit printing of basic dyes that imparts pigment properties to a spirit print with little change in the inherent brilliancy of shade and tinctorial value of the parent basic dye. Further objects will appear hereinafter.

These objects are accomplished by the following invention by combining a water-soluble basic dye, wood rosin and a volatile solvent such as ethyl alcohol in definitely fixed ratios, wherein, said rosin to dye is in a preferred minimum ratio of 3:1, and the ethyl alcohol is added in sufficient quantities to give concentrations ranging from 0.25% to 4% based on the dry weight of the dye; said inks possessing a suitable resistance to water bleeding when printed on paper, etc.

The term "spirit printing" as applied to the subject invention includes the broadened concepts of the present art, which interpret this term to embrace formulations comprising alcohol or other organic compounds which dry by evaporation.

The dyes should preferably, although not necessarily, contain a minimum amount of inorganic salts, especially those of an alcohol insoluble nature. This condition eliminates need of sediment removal from the formulated ink. The dyes should preferably be of a water-soluble nature. This includes soluble salts of basic dyes, e. g., hydrochlorides, oxalates, etc. However, no limitation is intended by this expressed preference, since the water-insoluble free bases of these dyes are also utilizable by the subject invention.

Various types of rosin may be used, and they should be selected on the basis of good alcohol solubility and the property of imparting to the dye mixture a minimum alteration in the inherent brilliancy of shade of the parent dye. A grade "K" or better is especially suitable. According to the standards (Lovibond Colorimeter tests) adopted by the Bureau of Chemistry and Soils, U. S. Department of Agriculture, a rosin of this type possesses physical constants of the following nature:

| | |
|---|---|
| Melting point °C | 50–60 |
| Acid value | 153–158 |
| Saponification value | 163–168 |
| Unsaponifiable matter per cent | 8.5–10 |
| Iodine value, Wijs | 214–218 |
| per cent | 0.05 |

To obtain the best ink, an anhydrous solvent is desirable. However, these inks will tolerate 15 to 20% of moisture in the solvent without any serious jeopardy to the color solubility. Denatured alcohol is especially recommended. Other lower or higher alcohols may be used provided the color solubility is not impaired. Likewise, other oxygenated, liquid alkyl or aryl compounds, e. g., esters, ethers, ketones, etc., may be substituted for the alcohol to act as solvents or modifiers.

A solvent may be defined as a liquid that possesses a good solvent power for the color and binder. A modifier may be defined as a liquid that may or may not possess a good solvent power but which may affect the boiling point, evaporation rate, penetration, mobility, etc., of the ink.

The product of this invention may be used in conjunction with binders which are natural or synthetic resins, e. g., shellac, glyptal, vinylite, copal resins, ethyl cellulose, etc., the only qualifying limits of the binder being complete solubility in the ink solvent in practical proportions and minimum alteration to the brilliance of shade of the parent dye.

The successful manipulation of this invention depends on two factors which concur to produce the suitable properties of these colors compounded with rosin. Firstly, the proper ratio of rosin to dye and, secondly, the proper concentration in alcohol must be attained before the optimum advantages in brilliance of shade, tinting value and resistance to bleeding in water are obtained.

In the heretofore customary spirit printing inks using tannic acid instead of rosin the experience has been obtained that, in the ranges where the tannic acid to dye ratio is between 1:1 and 3:1, the greater ratios of tannic acid create a deleterious effect on the brilliance and shade of the parent dye. This is more forcefully exhibited in alcoholic solutions ranging from 0.25% to 4% dye concentration. These ratios have no critical points of resistance to water bleeding; all being suitable to meet practical requirements.

In contrast, the rosin-dye combinations of the subject invention in ratios of 1:1 and 3:1 react differently than the tannin prototypes when tested under the analogous conditions. The increased ratios of rosin do not alter the shade of the dye perceptibly from that given by lower ratios. In addition, the behavior toward water-bleeding is different. Whereas, the tannic-acid-dye combinations do not present critical points of resistance to bleeding in water when compounded in the above ratios, the rosin-dye compositions when compounded in ratios of 1:1 and 2:1 are not sufficiently resistant to water bleeding; but in the ratio of 3:1 their resistance to water bleeding is of the same order as that obtained by the tannic-acid-dye compounds. Therefore, using rosin, a minimum ratio of 3 parts rosin to 1 part dye is in effect the lowest rosin limit needed to give a suitable resistance to water bleeding.

The optimum advantages of shade and strength are given by alcoholic solutions containing dye concentrations ranging from 0.25% to 4%, based on the dye weight. Greater dilutions may be employed, but the advantages of tinctorial strength are thereby lost.

It is interesting in this connection that, whereas the basic dyes in general, including the tannic acid compounds, exhibit such a high degree of bronze in 2% to 4% alcoholic solutions that they are unusable, the rosin-dye combinations of the subject invention are relatively free of bronze at these concentrations.

In the usual tannic-acid-dye spirit printing inks, it has been customary to employ shellac as a binder. In the inks of this invention, rosin takes the place of both tannic-acid and shellac. Furthermore, shellac cannot be substituted for rosin in the compositions of this invention with the same practical results, since I found that shellac does not render the dye water-resistant in the minimum ratio of 3:1. In addition, the shellac increases the viscosity of the ink beyond a practical limit for printing, whereas, the rosin-dye compounds of the subject invention do not perceptibly alter the typical viscosity of inks which employ only the parent dye.

The new inks are particularly adapted to rotary printing from rubber stereos.

This invention is best described but not limited by the following examples in which the parts are given by weight.

EXAMPLE I

| | Parts |
|---|---|
| Victoria Pure Blue BO dye powder (C. I. 707) | 0.25 |
| Powdered wood rosin grade "K" | 0.75 |
| Denatured alcohol | 99.00 |

Add the dye powder to the powdered wood rosin and mix until a homogeneously colored powder is obtained. Dissolve in the alcohol and print.

Comparisons against a mixture of the basic dye (C. I. 707) and tannic acid are as follows:

Solubility in alcohol _____ Superior
Shade _____ Greener and brighter
Strength _____ 25% stronger

*Bleeding resistance*

Water—very slightly inferior but sufficiently fast for normal requirements.
Lard fat—equal (non-bleeding).
Butter fat—equal (non-bleeding).
Paraffin wax—equal (non-bleeding).

EXAMPLE II

Same ingredients as in Example I, except use:

| | Parts |
|---|---|
| Dye | 3.75 |
| Rosin | 11.25 |
| Denatured alcohol | 85.00 |

The comparative results were of the same order enumerated in Example I. In addition, the bronzing tendency of the print was much less than with an equivalent concentration of the dye with tannic acid.

EXAMPLE III

Same ingredients as in Example I, except use:

| | Parts |
|---|---|
| Dye | 0.25 |
| Rosin | 24.75 |
| Denatured alcohol | 75.00 |

The relative properties are of the same order as the preceding examples.

EXAMPLE IV

Same recipes and procedure as in the preceding three examples, except substitute Brilliant Green dye powder (C. I. 662) for the Victoria Pure Blue BO.

The results show advantages of the order of the preceding examples.

EXAMPLE V

Same as in Examples I, II and III, except substitute Rhodamine 6GDN (C. I. 752) for the Victoria Pure Blue BO.

The relative superiority exhibited in the preceding examples is obtained.

EXAMPLE VI

Same ingredients and proportions as in Example 1, except add thereto 5 parts of shellac.

The use of rosin gives the same advantages over tannic acid as enumerated under Example I.

It will be apparent to one skilled in the art that many modifications may be made without departing from the scope of this invention. Either the conditions of combining the constituents may be greatly altered to produce an identical product, or by combining solvents or modifiers of different physical constants a number of inks may be obtained that possess greatly different properties. The only limiting factors of this invention are that the dyes be of the basic dye class, preferably soluble in water or alcohol, and may be compounded with an alcohol soluble wood rosin in the given ratios to produce a satisfactory resistance to water bleeding.

Any of the following basic dyes may be used in the ink composition to give the same advantages:

| Water soluble basic dyes | Color Index No. |
|---|---|
| Rhoduline Blue G | 926 |
| Victoria Green SC | 657 |
| Thioflavine TCN conc | 815 |
| Victoria Blue B conc | 729 |
| Auramine | 655 |
| Methyl Violet | 680 |
| Sufranine T Extra | 841 |
| Rhodamine B | 749 |
| Fuchsine | 677 |
| Crystal Violet | 681 |
| Methylene Blue | 922 |
| Victoria Blue R | 728 |
| Rhoduline Blue 6G | 658 |

The free base form of basic dyes may also be used in these formulations with rosin. Some bases are sufficiently insoluble in water, e. g., Methyl Violet Base, Victoria Blue B Base, etc., and need no agent present to further increase their water resistance, whereas, others, e. g., Auramine Base, Rhodamine B Base, etc., are not completely insoluble in water and the presence of rosin assists in their fixation to produce a greater resistance to water bleeding.

A number of inks may be formulated with other volatile, liquid alkyl, or aryl compounds by supplanting the alcohol, wholly or in part, for the purpose of obtaining either solvent or modification effects, which are otherwise unobtainable by the use of ethyl alcohol. These function as previously explained and should preferably boil within the range of 30 to 200° C. As typical examples of such other liquids may be mentioned:

Lower alcohols, such as methyl alcohol; B. P. 64.5° C.
Higher alcohols, such as octyl alcohol; B. P. 194° C.
Esters, such as ethyl acetate; B. P. 77° C.
Ethers, such as cellosolve; B. P. 135° C.
Acids, such as acetic acid; B. P. 118° C.
Ketone, such as acetone; B. P. 56° C.

Higher grade wood rosins may be utilized in this invention, including, for instance grades M, N, WG, WW and X.

Lower grade rosins may also be used, including for instance, grades B, D, E, F, G, H and I, but care must be exercised in this latter case to use the proper type of rosin with the proper dye so as not to jeopardize the inherent brilliance of the dye composition. The lower grades of rosin vary greatly in natural coloration. When this exceeds the intensity of the dye used in the composition an off-shade ink results.

Hydrogenated rosins may be used to supplant the above unsaturated rosins, with equally good results.

Pigments may also be added as desired to suit the formulation.

Altogether, the spirit printing compositions of this invention exhibit the following advantages over the tannic-acid-basic-dye mixtures:

Greater economic saving, greater brilliancy of shade, greater tinctorial strength, greater alcohol solubility, greater solution rate of components, lesser bronzing tendency, lesser surface tension on ink, and lesser dusting tendency of components.

I claim as my invention:

1. A spirit printing composition comprising a dyestuff from the basic dye class, a rosin selected from the group consisting of unsaturated and saturated abietic acids, and an oxygenated organic solvent, having a boiling point within the range from 30° C. to 200° C.; said rosin and dyestuff being present in a minimum ratio of 3:1 by weight, and said solvent being present in sufficient quantity to form a dye concentration within the range of 0.25% to 4% by weight.

2. A spirit printing ink comprising a dyestuff from the basic dye class, a powdered wood rosin and ethyl alcohol; said rosin and dyestuff being present in a minimum ratio of 3:1 based on their dry weights, and said ethyl alcohol being present in sufficient quantity to form a dye concentration of at least 0.25% by weight.

3. A spirit printing ink as defined in claim 2, wherein said ethyl alcohol is present in sufficient quantity to form a maximum dye concentration of 4% by weight.

ROY CLIFFORD LOCKE.